March 7, 1939. E. J. LENNART 2,149,609
FLUID DISPENSING APPARATUS
Filed Feb. 6, 1932 3 Sheets-Sheet 1

Inventor:
Eugene J. Lennart
By Atkinson, Huxley, Bynon Knight
Attys

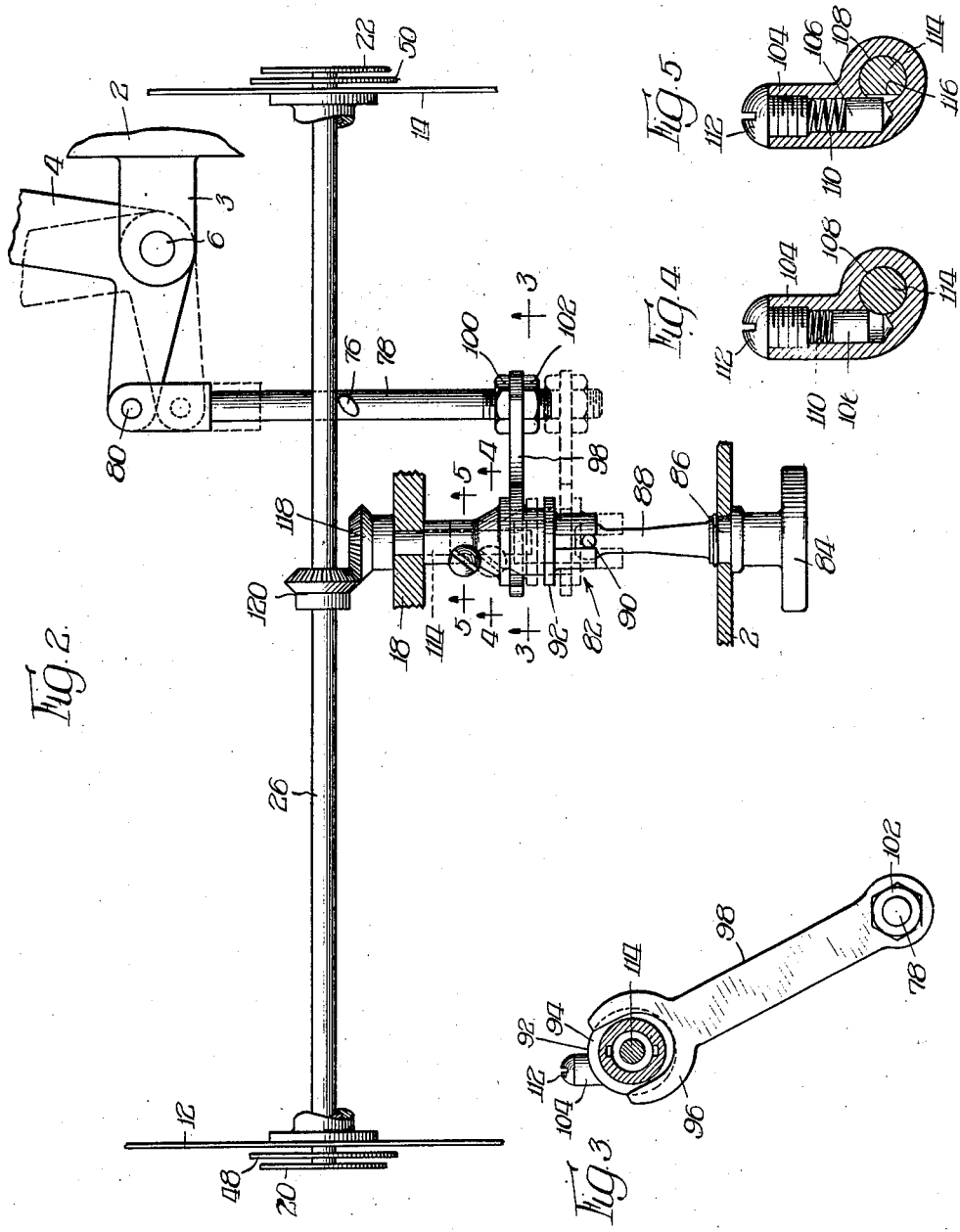

March 7, 1939.  E. J. LENNART  2,149,609
FLUID DISPENSING APPARATUS
Filed Feb. 6, 1932  3 Sheets-Sheet 3
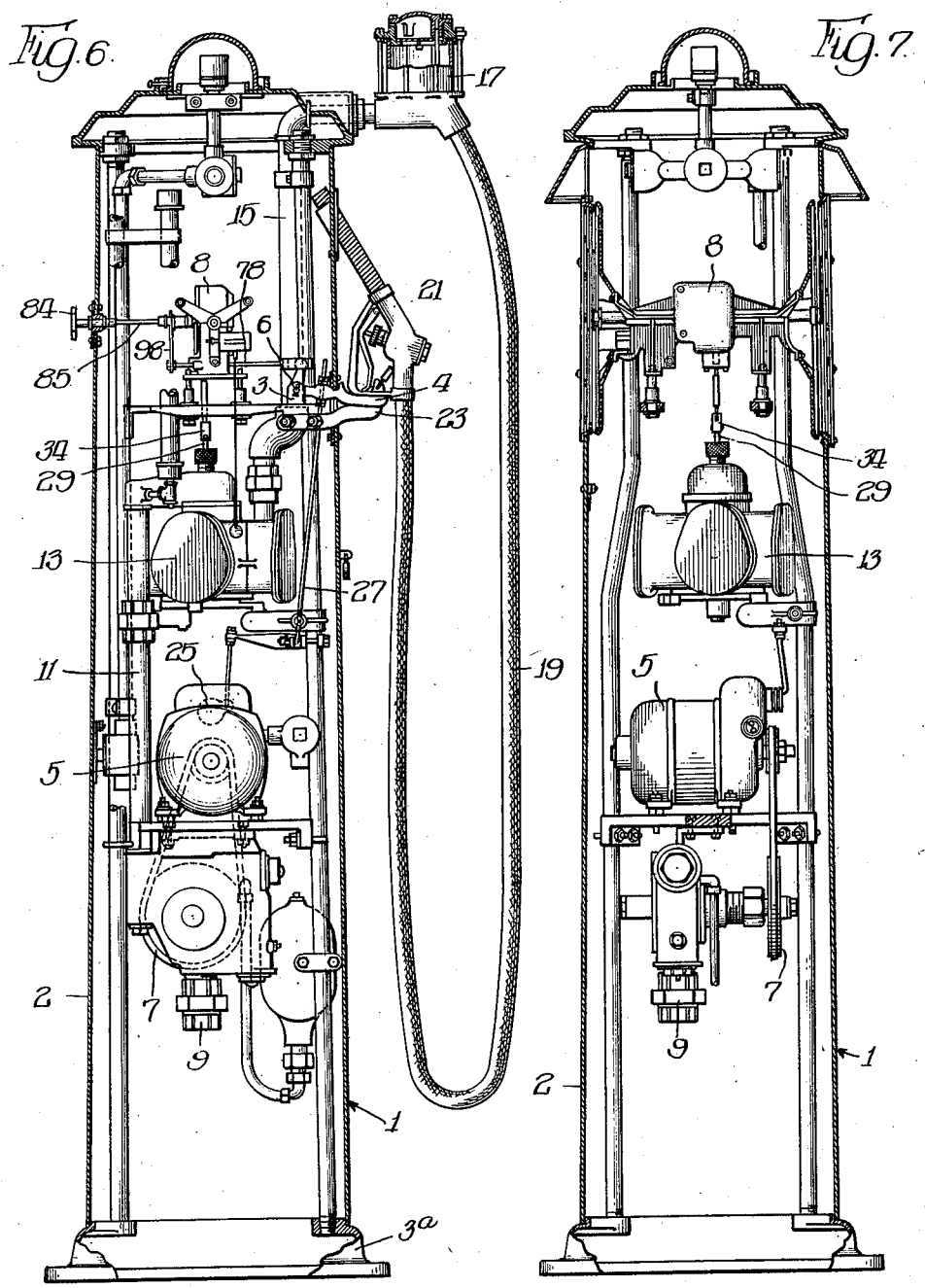
Inventor:
Eugene J. Lennart,
By Wilkinson Huxley Byron & Knight  Attys Patented Mar. 7, 1939

2,149,609

UNITED STATES PATENT OFFICE 2,149,609

FLUID DISPENSING APPARATUS

Eugene J. Lennart, Fort Wayne, Ind., assignor, by mesne assignments, to The Wayne Pump Company, Fort Wayne, Ind., a corporation of Maryland Application February 6, 1932, Serial No. 591,347

11 Claims. (Cl. 221—95)

The present invention relates to fluid dispensing apparatus and more in particular to means for resetting indicating means thereof.

Among the objects of the present invention is to provide novel means in a fluid dispensing apparatus for resetting or independently moving the indicating means thereof.

Another object of the present invention is to provide novel means for resetting the indicating means for a fluid dispensing apparatus which includes suitable means for rendering this resetting or independently movable means ineffective to move said indicating means under certain conditions.

The present invention contemplates the idea of providing novel means in a fluid dispensing apparatus having power means for delivering fluid, as likewise indicating means which is operable in accordance with the fluid discharged for determining the quantities of fluid dispensed by the apparatus, whereby this indicating means may be independently moved, further means being provided for rendering this independently movable means ineffective to move the indicating means during operation of the power means.

Another object within the purview of the present invention is to provide a novel fluid dispensing apparatus provided with power means for delivering fluid, and which further includes indicating means operable in accordance with the fluid discharged for determining the quantities thereof dispensed by said apparatus, as likewise suitable means adapted to permit initial operation of the power means only when said indicating means is in a predetermined position.

The present invention still further includes the dea of providing means for independently moving or resetting the indicating means after each delivery of fluid from the apparatus which has means associated therewith and with the control means for the power means, whereby the resetting means or mechanism is rendered ineffective to move the indicating means during the operation of the power means.

The present invention further contemplates the idea of providing a fluid dispensing apparatus in which the control means is adapted to be operated for initiating operation of the power means only when the indicating means is in a predetermined position.

Still a further object of the present invention is to provide novel means in a fluid dispensing apparatus adapted to be associated with a control means which is operable only when the indicating means is in a predetermined position for initiating operation of the power means for delivering fluid, whereby this resetting mechanism is rendered ineffective to move the indicating means during the operation of the power means.

The present invention still further comprehends the idea of providing a novel fluid dispensing apparatus in which the control means for the power means is provided with suitable mechanism for supporting the discharging means of the apparatus, this supporting mechanism being adapted to be moved, upon removal of the discharging means, into a position for rendering the resetting means or mechanism inoperable during the operation of the power means.

Still a further object of the present invention is to provide a novel fluid dispensing apparatus in which the control means for the power means is operable only when the indicating means is in a predetermined position and which is provided with suitable supporting mechanism for a discharging means of the apparatus, this supporting mechanism being adapted to be movable, upon removal of the discharging means, for rendering resetting mechanism for the indicating means ineffective during the operation of the power means.

Other objects, features, capabilities and advantages are comprehended by the invention, as will later appear and as are inherently possessed thereby.

Referring to the drawings:

Figure 2 is a detached top plan view of a portion of the device shown in Figure 1 of the drawings, the same disclosing more in detail suitable means for resetting the indicating means thereof and having a portion diagrammatically disclosed;

Figure 3 is a view partly in cross section and partly in elevation and taken in a plane substantially represented by line 3—3 of Figure 2 of the drawings;

Figure 4 is a view in cross section taken in the plane represented by line 4—4 of Figure 2 of the drawings;

Figure 5 is a view in cross section taken in a plane represented by line 5—5 of Figure 2 of the drawings;

Figure 6 is a view in vertical cross-section of a dispensing apparatus incorporating another embodiment of the present invention;

Figure 7 is a view in vertical cross-section of the device shown in Figure 6 of the drawings, taken in a plane normal thereto.

Figure 1:
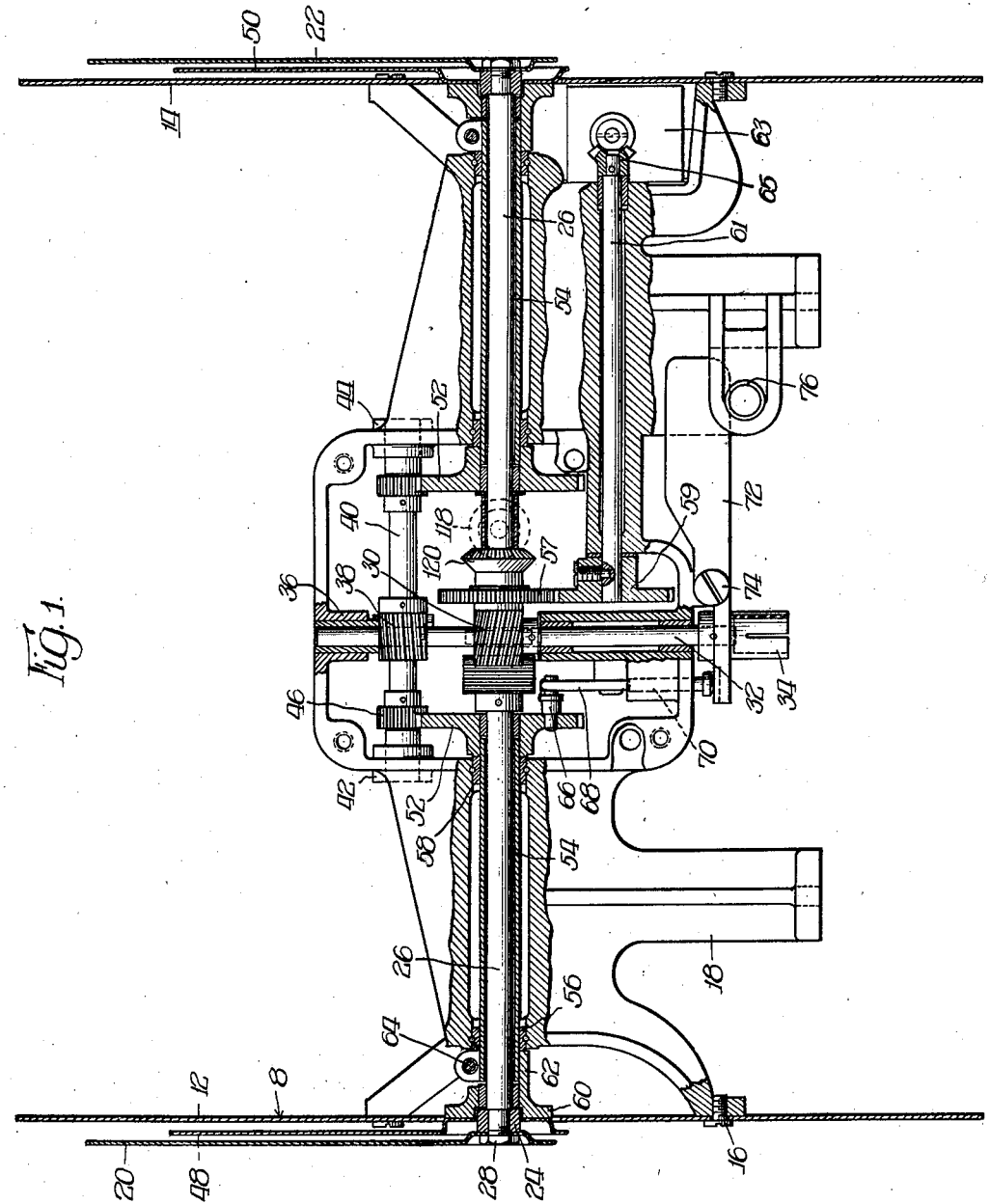
Figure 1 is a view in side elevation of an embodiment made in accordance with the present invention and having parts shown in cross section to disclose the construction thereof more in detail.

Referring now more particularly to the drawings, an embodiment selected to illustrate the invention is shown in connection with a dispensing pump 1 having a casing 2 suitably supported at its lower end upon pedestal 3a. Disposed within the casing 2 is a motor 5 for operating a pump 7 which is connected on the suction side thereof to a pipe 9 leading to a source of supply (not shown), such as gasoline, or the like. The outlet side of the pump 7 is connected to a pipe 11 which is connected, in turn, to the inlet side of a meter 13 which may be of a piston-displacement type, or any suitable type accurately measuring the amount of liquid passing therethrough, the measured liquid flowing through a pipe 15 to the sight gauge 17 and being dispensed through the hose 19 and the hand-operated nozzle 21. This nozzle is normally supported in its inoperative position, as shown in Figure 6 of the drawings, upon the bracket 23 projecting upwardly from the casing 2, this nozzle likewise engaging a hook member 4 in the form of a bell crank lever which projects through a suitable opening in the casing 2 and is pivoted for movement as at 6 to bracket 3.

The bell crank lever 4 has its outwardly extending leg connected to a contact switch 25 for operating the motor 5 through the rod mechanism, which is generally designated as 27, the switch 25 being adapted to be disconnected by the mechanism 27 when the hook member 4 is in its lowermost position, as shown in Figure 6 of the drawings. The inner end of the hook member 4 is associated with indicating and reset mechanism 15 and 85, respectively, as will be pointed out more fully hereinafter.

In the embodiment shown, the casing 2 is provided with a bracket 3 to which the hose supporting hook 4 is pivoted as at 6, the hose supporting hook being in the form of a bell crank adapted to control operation of electric or other motor through the mechanism 27 and contact switch 25. The bell crank then may be termed a part of the control mechanism, which is associated with the indicating means referred to generally by the reference numeral 8. The indicating means 8 includes the dials 12 adapted to have suitable indicia thereon such as the numerals indicating the various number of gallons or fractions thereof to be dispensed, the dials being secured as by means of a plurality of screws 16 in oppositely disposed relation to the frame 18 enclosed within the casing or housing 2. This indicating means is further provided with pointers 20 and 22, each of which has a collar or hub 24 associated therewith which is adapted to fit over the ends of a shaft 26 and be secured thereto as by means of the nuts 28 threadedly engaging the ends of this shaft. The pointers 20 are adapted to indicate the fractional parts of units of fluid being dispensed by the apparatus, and the shaft 26, to which the same are secured, is adapted to be rotated by means of suitable gearing, generally designated by the numeral 30 associated with a jack shaft 32. This jack shaft 32 is connected as by means of a coupling 34 to the displacement meter 13 by means of shaft 29, which measures the amount of fluid being drawn off from the tank within the casing 2 and discharged through the discharge hose 19. The shaft 32 has its uppermost end journaled in the bearing 36 and is adapted, through the medium of suitable gearing 38, to rotate a transversely disposed shaft 40, which has its end suitably journaled in the bearings 42 and 44 provided in the frame 18.

Mounted upon the shaft 40 adjacent each end thereof are pinions 46 operatively associated with suitable mechanism for causing movement of the pointers 48 and 50 over the face of the dials 12 and 14, respectively, for indicating the units of fluid being dispensed by the apparatus. These mechanisms are of similar construction and each comprises a gear 52 secured to one end of a sleeve member 54 which surrounds the shaft 26 and which is suitably mounted, within bearings provided in the frame 18, as by means of the collars or bushings 56 and 58. At the outer end of the sleeve 58 is a supporting member 60 to which a pointer 48 is secured, this supporting member 60 being formed with a split hub 62 adapted to fit over the end of the sleeve member 54 and be secured thereto as by means of a bolt or the like 64. As will be clearly apparent from the drawings, the ratio of the diameters of the gears 46 and 52 is such as to cause movement of the pointers 48 and 50 between adjacent indicia upon the discs 12 for each complete revolution of the pointers 20 and 22, respectively. Shaft 26 is provided with a gear 57 meshing with gears 59 for operating the shaft 61 which shaft is adapted to operate the totalizer 63 through gears 65.

As clearly shown in Figures 2 and 6 of the drawings, the bell crank 4 as shown in full lines is in the position which the same will assume when the discharging means or hose is supported thereon. At this time the contacts of the switch 25 are disengaged, whereby the electric motor 5 is inoperative.

The present invention contemplates the idea of providing suitable means for controlling the movement of the bell crank 4 for initiating the operation of the power means only when the pointers of the indicating means are in a predetermined position, as for example, at the zero reading. Such means includes a pin 66 secured to one of the gears 52 which is adapted, when the pointers of the indicating means are at their zero reading, to contact a cam lever 68, which is adapted to depress a slidable pin 70 which bears against or is supported by the end of a lever 72 pivoted to the frame 18, as by means of a screw member 74. The opposite end of the lever 72 is adapted, when the pointers of the indicating means are in a position other than their zero reading, to normally abut a shoulder 76 formed on the rod 78, which is pivoted as at 80 to the end of the bell crank lever 4. Because of the engagement between the lever 72 and the shoulder 76, movement of the bell crank lever from its position as shown in full lines in Figure 2 of the drawings to that position as shown in dotted lines, is prevented. However, when the pointers of the indicating means are reset through suitable mechanism, to be later more fully disclosed, to their zero reading, the sliding pin 70 is depressed for moving the lever 72 about its pivot point 74, whereby this disengagement between the lever 72 and the shoulder 76 is effected.

The resetting mechanism or means for moving the pointers of the indicating means independently of the shaft 32, generally designated by the reference numeral 82, includes a knob 84 positioned exteriorly of the casing 2, this knob having a bearing 86 suitably journaled in an opening provided in the casing 2, and a shaft 88 provided with a transversely disposed pin 90 loosely mounted in suitable slots provided in a yoke member 92. The yoke 92 is formed with an annular recess 94 engaged by the bifurcated end portion 96 of a shipper member 98 which is secured to an end of the rod 78, as by means of the nuts 100 and 102 threadedly engaging this end of the rod 78.

When the bell crank lever 4 is in the position as indicated in full lines in Figure 2 of the drawings, whereby the power means is inoperative, the shipper member 98 and yoke 92 are in the position as shown in full lines in this figure. The yoke member 92 is formed with a tubular portion 104 within which is provided a plunger 106 normally urged toward an opening or bore 108 as by means of a coil spring 110 interposed between this plunger 106 and a screw member 112 threadedly engaging the tubular portion 104. Within the bore or opening 108 is a shaft 114 supported for rotation by the frame member 18, this shaft 114 being formed with a transverse groove 116 merging into a gradually tapering slot for raising the plunger 106 out of the groove by movement of the shaft, it being understood that the groove receives the plunger when the yoke 92 is in the position as shown in full lines in Figure 2 of the drawings, whereby rotation of the knob 84 causes rotation of the shaft 114, to which is secured a beveled pinion 118 meshing with a similar pinion 120 which is mounted upon the shaft 26.

By means of the resetting mechanism 82, the pointers of the indicating means are moved or returned to their zero reading upon movement or rotation of the knob 84 by an attendant when the bell crank lever 4 is in a position to cause a disengagement of the contacts of the switch controlling the circuit for the electrical motor. When the discharging means or flexible hose 19 and nozzle 21 are removed from the hook member associated with the bell crank lever 4, the bell crank lever 4 may be manually moved into the position as shown in dotted lines in Figure 2, assuming that the pointers of the indicating means have been reset or returned to their zero reading. Movement of the bell crank 4 serves to move the plunger 106 from engagement with the groove 116, whereby a disconnection between the yoke 92 and the shaft 114 is effected, rendering this resetting means inoperative during operation of the power means.

It will be quite apparent from the above disclosure, that an attendant delivering various quantities of fluid from a fluid dispensing apparatus including the novel features hereinbefore pointed out, cannot independently move the pointers of the indicating means during the operation of the power means which is adapted to deliver these quantities of fluid from the apparatus, so that the customer is assured that the pointers of the indicating means correctly show the amounts which have been delivered into the fluid receiving means, such as an automobile tank, or the like. It will also be clearly seen that the power means for delivering fluid from this dispensing apparatus cannot be initially operated until such time as the pointers have been moved or reset to their zero reading, and once the dispensing device is rendered inoperative it cannot again be operated until the pointers are reset to their zero position.

While I have herein described and upon the drawings shown an illustrative embodiment of the invention, it is to be understood that the invention is not limited thereto but may comprehend other constructions, arrangements of parts, details and features without departing from the spirit of the invention.

I claim:

1. In a fluid dispensing apparatus, the combination of power means for delivering fluid, means for controlling operation of said power means, said means including manually movable mechanism for initiating operation of said power means, indicating means operable in one direction in accordance with the fluid discharged for determining the quantities dispensed by said apparatus, selectively operable means including a clutch for moving said indicating means in an opposite direction to that first named, and means operated upon movement of said mechanism for opening said clutch for rendering said last mentioned means ineffective to move said indicating means.

2. In a fluid dispensing apparatus or the like, the combination of means for discharging quantities of fluid, indicating means operable in one direction for determining the quantities of fluid delivered from said apparatus, means for initiating discharge of said fluid, said means including a movable member selectively operable, means including a clutch for moving said indicating means in an opposite direction to that first named, means so constructed and arranged with said indicating means that it is movable into and out of the path of movement of said movable member, said last-mentioned means being normally out of the path of movement of said movable member when said indicating means is in its zero recording position whereby said initiating means may be operated, and means for opening said clutch for rendering said independently operated means inoperative during discharge of fluid.

3. In a device of the class described, an indicator and means for moving the same including a power-control element, means for resetting said indicator including a clutch, means for interconnecting said power-control element and clutch so that movement of said power-control element into energizing position will positively open said clutch and movement of said power-control element out of energizing position will produce a closing of said clutch, and means controlled by said indicator and operating when said indicator is out of reset position for preventing a movement of said power-control element into energizing position.

4. In a device of the class described, an electrically actuated motor-pump assembly and a control switch for said motor, manually operable means for closing and opening said switch, a liquid meter for measuring the quantity of liquid passing from said pump to a dispensing point, an indicator driven by said meter, manually operable means for resetting said indicator including a clutch, and means for interconnecting said manual switch means and said clutch so that movement of said switch into energizing position will produce a positive opening of said clutch prior to a closure of the switch and movement of said switch out of energizing position will produce a closing of said clutch after said switch has been opened.

5. A device as in the preceding claim, including means actuated with the indicator for preventing a closing of the switch when said indicator is out of reset position.

6. In a liquid dispensing apparatus, the combination of dispensing means, a meter for measuring the liquid dispensed, a pump connected to said meter for supplying liquid from a source of supply to said dispensing means through said meter, said meter having a rotatable meter shaft, registering mechanism connected to said meter shaft and operated proportionally to the rotation of said shaft for registering the liquid dispensed through said meter, reset means for said registering mechanism including a manually rotatable reset shaft, control means for controlling the dispensing of liquid from said liquid dispensing apparatus, said control means including a member for preventing said reset shaft from rendering said registering mechanism inoperative when liquid is being dispensed and said registering mechanism is being operated by said meter shaft, controllable means for maintaining said control inoperative when said control means has been rendered inoperative after a dispensing operation, said last named means including a movable member disposed adjacent said registering mechanism, and means operable by said registering mechanism for moving said movable member when said reset shaft has moved said registering mechanism to a predetermined position to release said controllable means to thereupon permit operation of said control means for dispensing operation.

7. In a liquid dispensing apparatus, the combination of dispensing means, a meter for measuring the liquid dispensed, a pump connected to said meter for supplying liquid from a source of supply to said dispensing means through said meter, said meter having a rotatable meter shaft, registering mechanism connected to said meter shaft and operated proportionally to the rotation of said shaft for registering the liquid dispensed through said meter, reset means for said registering mechanism including a manually rotatable reset shaft, control means for controlling the dispensing of liquid from said liquid dispensing apparatus, controllable means for maintaining said control inoperative when said control means has been rendered inoperative after a dispensing operation, said last named means including a movable member disposed adjacent said registering mechanism, and means operable by said registering mechanism for moving said movable member when said reset shaft has moved said registering mechanism to a predetermined position to release said controllable means to thereupon permit operation of said control means for dispensing operation.

8. In a liquid dispensing apparatus, the combination of dispensing means, a meter for measuring the liquid dispensed, a pump connected to said meter for supplying liquid from a source of supply to said dispensing means through said meter, said meter having a rotatable meter shaft, registering mechanism connected to said meter shaft and operated proportionally to the rotation of said shaft for registering the liquid dispensed through said meter reset means for said registering mechanism including a manually rotatable reset shaft, control means for controlling the dispensing of liquid from said liquid dispensing apparatus, said control means including a member for normally disconnecting said reset shaft from said registering mechanism when liquid is being dispensed and said registering mechanism is being operated by said meter shaft, controllable means for maintaining said control inoperative when said control means has been rendered inoperative after a dispensing operation, said last named means including a movable member disposed adjacent said registering mechanism, and means operable by said registering mechanism for moving said movable member when said reset shaft has moved said registering mechanism to a predetermined position to release said controllable means to thereupon permit operation of said control means for dispensing operation.

9. In liquid dispensing apparatus, the combination of power means for delivering liquid, registering mechanism for indicating the amount of liquid dispensed, reset means including a clutch for resetting said registering mechanism to a predetermined position, control means for controlling operation of said power means, and means operatively connected to said control means and reset means and so constructed and arranged that said clutch will be opened to render said reset inoperative during operation of said power means.

10. In liquid dispensing apparatus, the combination of power means for delivering liquid, registering mechanism for indicating the amount of liquid dispensed, reset means including a clutch for resetting said registering mechanism to a predetermined position, control means for controlling operation of said power means, and means operatively connected to said control means and reset means and so constructed and arranged that said clutch will be opened to render said reset inoperative during operation of said power means, and a connection between said registering mechanism and control means and so constructed and arranged with respect thereto that said control is initially operable only when said registering mechanism is in a predetermined position.

11. A liquid dispensing system including a pump and driving means therefor, control means through which when in one position said driving means may be energized and in another position said driving means is not energized, a liquid meter for measuring the dispensed liquid, an indicator driven by the meter and having a predetermined initial position, and interlocking means actuated by said control means and said indicator for preventing the resetting of said indicator while said control means is in said one position and for preventing the movement of said control means into said one position when said indicator is in other than said initial position.

EUGENE J. LENNART.